Patented Oct. 25, 1932

1,884,624

UNITED STATES PATENT OFFICE

CAMILLE DREYFUS, OF NEW YORK, N. Y.

METHOD OF MAKING LAMINATED GLASS

No Drawing.   Application filed January 22, 1929. Serial No. 334,368.

This invention relates to the preparation of shatterless laminated glass, wherein one or more sheets of a plastic composition containing derivatives of cellulose is inserted between two or more sheets of glass, and relates more particularly to a method of causing such sheets to adhere firmly to each other.

An object of my invention is to prepare well stuck laminated glass by subjecting either the sheets of glass or the sheets of plastic compositions containing derivatives of cellulose, or both, to elevated temperatures prior to pressing the same. Further objects of my invention will appear from the following detailed description.

In the preparation of laminated glass by present methods, a sheet of plastic material containing derivatives of cellulose is inserted between sheets of adhesive coated glass, and the assembly is pressed by means of a suitable press having heated platens. The theory of this operation is that the heat from the platens is transmitted through the glass to the coat of adhesive and the plastic sheet, causing the same to soften and thus to obtain better adhesion. However, in this method, breakage of a large percentage of the glass results, and very often the adhesion of the plastic sheet to the glass is very poor. I have found that these unsatisfactory results are due to the fact that since both glass and plastic sheets containing derivatives of cellulose are poor conductors of heat, the heat from the heated platens is not transmitted sufficiently rapidly so that satisfactory results are not obtained. On account of the poor transmission of the heat through the glass, stresses and strains are set up therein because of the difference of expansion of the parts of the glass that are heated at different temperatures, and thus breakage of the glass results. Moreover, because of the poor heat transmission, in the limited time to which the assembly of glass and plastic material is subjected to elevated temperature, the plastic sheets do not become sufficiently heated to obtain optimum adhesion. I have found that if either the sheets of glass or the sheets of plastic material containing derivatives of cellulose, or preferably both, are heated to elevated temperature prior to their assembly, upon subsequent pressing the above disadvantages are obviated, so that breakage of the glass is largely avoided and much better adhesion is obtained, and the pressure employed in pressing may be reduced considerably.

In accordance with my invention I prepare laminated glass by pressing an assembly of one or more sheets of plastic material containing derivatives of cellulose between adhesive coated glass, which plastic sheets or sheets of glass, but preferably both, have been preheated to a suitable elevated temperature prior to insertion between the platens of the press.

The sheets of plastic material and/or the sheets of adhesive coated glass may be preheated in any suitable apparatus, such as ovens, steam chests, or chambers containing closed coils having suitable heating media circulated therethrough or having electrical resistances therein. While the temperature to which these materials may be preheated is variable, depending on the melting or softening points of the plastic compositions, the nature of the derivatives of cellulose employed therein and other factors, I have found that temperatures of above 50° C., say from 100° C. to 200° C. produce satisfactory results. In the selection of the temperature employed, care should be taken that these temperatures are below the point of decomposition of the particular derivatives of cellulose present. It may be mentioned that if cellulose nitrate is employed, because of the inflammable and explosive nature of this substance, comparatively low temperatures should be used.

Any suitable derivative of cellulose may be employed in making the plastic composition. It may be cellulose nitrate but I prefer organic derivatives of cellulose such as organic esters of cellulose or cellulose ethers. Examples of organic esters of cellulose are cellulose acetate, cellulose formate, cellulose propinonate and cellulose butyrate, while examples of cellulose ethers are ethyl cellulose, methyl cellulose and benzyl cellulose.

The plastic composition employed in making the sheets may be formed by dissolving the derivative of cellulose in any suitable solvent or solvent mixtures. Examples of such volatile solvents are acetone, ethyl acetate, ethylene dichloride or mixtures of these containing benzene, methyl alcohol, ethyl alcohol, chloroform or methylene dichloride. The above mentioned volatile solvents, while when used alone are solvents for some of the derivatives of cellulose, they are not solvents for others, and it is to be understood that suitable mixtures will be employed for any particular derivative of cellulose. Any suitable plastifier such as camphor, triacetin, diethyl tartrate, dibutyl tartrate, diethyl phthalate, diphenylol propane, etc., may be employed. If desired, resins, particularly synthetic resins compatible with the derivatives of cellulose may be added to the plastic composition, and stabilizers such as urea may also be employed therein. To oppose the natural yellowness of these plastic compositions, I prefer to add a stable blue dye such as Ponsol blue.

For making sheets of a plastic composition to be used in the laminated glass, a plastic mass of the same containing volatile solvents may be worked on malaxating rolls, the sheets formed from the rolls blocked in a press, and then sheets of suitable thickness may be cut from such block. In another application of my invention, a coating composition may be made and the coating composition spread on a smooth surface to permit the evaporation of the volatile solvent. In still another form, the coating composition may be applied directly to the adhesive coated sheets of glass to be employed for making the laminated glass, and the amount of coating composition employed will be sufficient to produce a film or sheet of the desired thickness.

Any suitable thermoplastic solid adhesive may be coated onto the sheets of glass, such as gelatin, a vinyl acetate resin or a synthetic resin compatible with the derivative of cellulose in the plastic sheet. Examples of synthetic resins compatible with organic derivatives of cellulose are the soluble and fusible phenol-aldehyde resins prepared in the presence of an acid catalyst, such as is described in application No. 217,536 filed September 3, 1927, diphenylol propane-formaldehyde resins, such as described in application No. 227,869 filed October 21, 1927, toluene sulfonamid-formaldehyde resins, and a resin formed by heating lactic acid under reflux, as more fully described in applications Nos. 313,961, 313,962, 313,963 and 313,964, filed October 20, 1928.

As stated, either the adhesive coated sheets of glass or the sheets of plastic composition containing derivatives of cellulose, and preferably both, are heated to a suitable temperature in proper heating devices. These sheets of glass and of plastic material may be heated separately to the same or different temperatures, or the same may be assembled in the manner in which they are to appear in the final form prior to the preheating. In any case the assembly of the sheets of glass having between them the sheets or films of the plastic composition containing derivatives of cellulose, after this preheating, are pressed between the platens of a press at suitable temperature, which platens are heated to an elevated temperature by steam or other means, as is now practiced. Because of this preheating, the percentage of breakage of the glass is considerably reduced, and well stuck laminated glass, substantially free of letgoes and other defects of adhesion are produced.

While ordinary cellulose derivatives may be employed in making the plastic or coating compositions to be used for making the plastic sheets, I have found that much better results from the point of view of light-fastness may be obtained with the use of specially purified derivatives of cellulose. The derivatives of cellulose, such as cellulose acetate, may be purified by careful and thorough filtration of solutions of the same, as described in the application of W. H. Moss, 313,966, or by the treatment of the same either in solid form or in solution with oxidizing agents such as nitric acid, hydrogen peroxide, a hypochlorite, etc. Often it is desirable to extract the derivatives of cellulose with ether to improve the clarity of the plastic composition.

Of the derivatives of cellulose to be employed in making the plastic composition, I prefer to employ cellulose acetate.

It is to be understood that the foregoing detailed description is given merely by way of illustration and that many variations may be made therein without departing from the spirit of my invention.

Having described my invention what I claim and desire to secure by Letters Patent is:

1. The method of making laminated glass comprising separately heating sheets of glass coated with a thermoplastic solid adhesive and a plastic sheet containing organic derivatives of cellulose and then pressing at high pressure by means of heated solid surfaces, said heated sheet of plastic material between said heated sheets of glass, whereby a well stuck laminated glass is formed.

2. The method of making laminated glass comprising separately heating sheets of glass coated with a thermoplastic solid adhesive and a plastic sheet containing cellulose acetate and then pressing at high pressure by means of heated solid surfaces, said heated sheet of plastic material between said heated sheets of glass, whereby a well stuck laminated glass is formed.

In testimony whereof, I have hereunto subscribed my name.

CAMILLE DREYFUS.